INVENTORS
ROBERT J. ROSENVOLD
LLOYD K. ROSENVOLD

BY *Wynne + Festen*

ATTORNEYS

3,214,865
PLANT PROTECTOR
Robert J. Rosenvold and Lloyd K. Rosenvold, both of 1101 Main St., Montrose, Colo.
Filed Feb. 3, 1964, Ser. No. 341,982
1 Claim. (Cl. 47—29)

This invention relates to a plant protector; specifically this invention relates to a novel plant protector which may be inserted in the ground in one operation or motion. In present plant covers, additional steps are required, such as placing a cover over a plant and then inserting anchor pins or sticks through the cover and then into the ground to anchor the cover in position. This construction is undesirable and is made unnecessary by the plant protector of the instant invention which is provided with integral ground penetrating means suitably reinforced to withstand the strain of being pushed into the ground.

It is an object of this invention to provide a novel one-piece plant protector having integrally formed ground penetrating means so formed as to enable each penetration of the ground and to insure the retention of the plant protector in its position over the plant.

It is another object of this invention to provide pre-punched knockout sections in the plant protector which may be selectively knocked out to provide ventilation openings in the plant protector as desired.

Another object of this invention is to provide a strong and durable yet inexpensive plant protector which may be formed by any suitable one-step mold process.

Further objects of this invention will become apparent with the discussion of the figures wherein.

Figure 1:
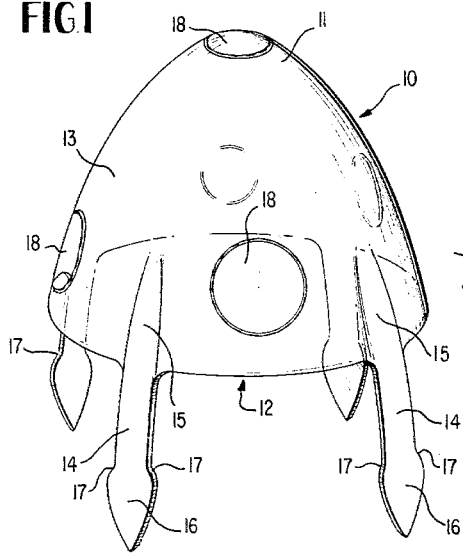
FIGURE 1 is a perspective view of the plant protector.

The plant protector as shown in FIGURE 1 consists of a body member 10 in the form of a conoidal shell having a closed end portion 11, an open end 12 and a side wall portion 13. The plant protector also has spaced, depending, ground-penetrating leg members 14 which originate as integral thickened portions 15 of the side wall portion 13 and extend downwardly from the side wall portion 13 and from the open end 12. The purpose of the thickened portions 15 is to provide reinforcement and strength at the junctions of the leg members 14 and the side wall portion 13, the areas which are under the greatest stress when the plant protector is pushed downwardly and into the ground.

Each of the leg members 14 is provided with a flanged pointed portion indicated by the numeral 16 to aid the leg members 14 in penetrating the ground. Each leg member has a length about one-half the height of the dome formed by the body member as seen particularly in FIG. 4.

The shoulders 17 of the flanged, pointed portions 16 serve the purpose of retaining the plant protector in its ground inserted position over a plant. In other words, the flanged, pointed portions 16 provide the same effect as an arrowhead or the like.

The plant protector is provided with knockout sections 18 in the side wall portion 13 and in the closed end portion 11 of said body member 10, which may be knocked out as desired to provide ventilation openings 19 in the body member 10. The knockout sections 18 are pre-punched by suitable means so that they may be readily knocked out with a slight tapping action. For example, the knockout sections may be defined by a succession of partial perforations formed by a pre-punching operation. Any number of knockout sections 18 may be provided in the plant protector depending upon particular needs. The knockout sections 18 as shown, are circular in shape and may vary in size relative to one another, again to enable the variance of the amount of ventilation permitted within the body member 10. It is to be understood, however, that the knockout sections 18 may be of any size and shape.

Figure 2:
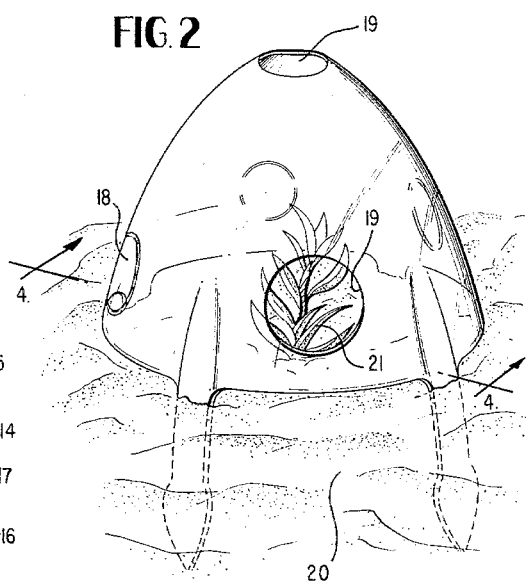
FIGURE 2 is a perspective view of the plant protector in FIGURE 1 in position over a plant and having ventilation openings therein.

In FIGURE 2 the plant protector is shown inserted in the ground 20 over a plant 21. The ventilation holes 19 were formed by knocking out one of the knockout sections 18 in the side wall portion and the knockout section 18 in the closed end portion 11.

Figure 3:
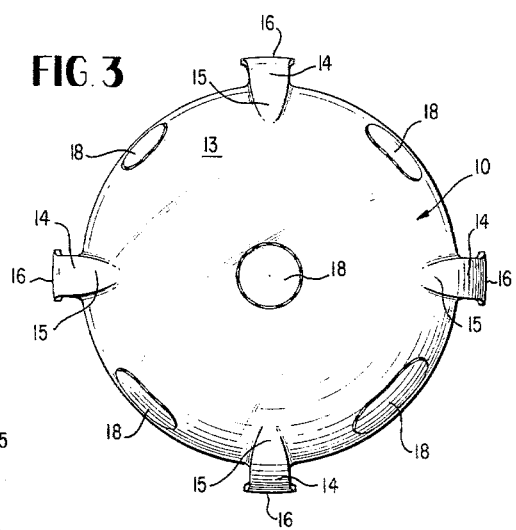
FIGURE 3 is a top plan view of the plant protector shown in FIGURE 1.

FIGURE 3 shows the closed end portion 11 and side wall portion 13 of the body member 10, and all of the knockout sections 18. FIGURE 3 also shows the integral thickened portions 15 of the side wall portion 13, which lend rigidity at the junction of the ground penetrating leg members 14 and the side wall portion 13.

Figure 4:
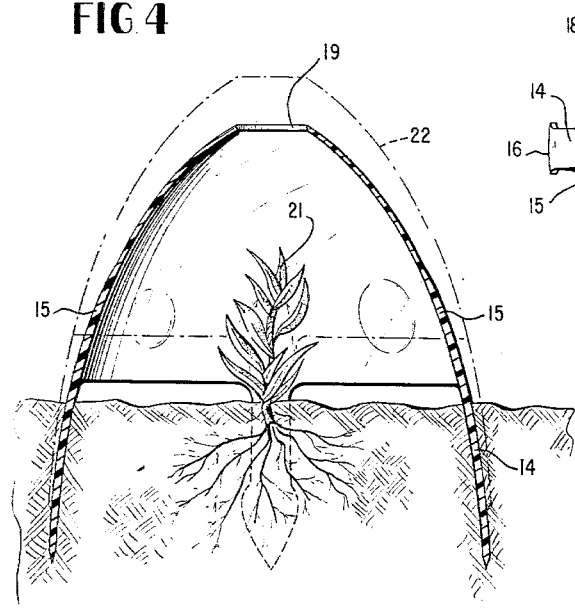
FIGURE 4 is a cross-section of the plant protector taken on lines 4—4 of FIGURE 2.

In FIGURE 4 the plant protector is shown in cross section in its ground-inserted position. As indicated by the dotted line 22, the plant protector may be inserted to various depths in the ground 20 which means that the amount of ventilation allowed within the body member 10 may be further varied since the distance between the body member 10 at its open end 12 and the ground 20 may be varied.

In operation, the plant protector can be readily inserted in the ground 20 in one step by pushing downwardly upon the closed end portion 11 of the body member 10. The flanged, pointed portions 16 enable easy penetration of the ground while any stress or strain is absorbed by the integral thickened portions 15. The shoulders 17 help to retain the plant protector in its ground inserted position. Ventilation openings 19 may be provided as desired by knocking out knockout sections 18. Ventilation may be further varied by varying the depths to which the plant protector is inserted in the ground.

The plant protector as shown is preferably formed of a transparent or translucent plastic material and may also be constructed of a tinted plastic, again to increase the versatility of this novel device.

It will be known that the invention is not to be limited to the construction shown and described but that various changes and modifications may be made without departing from the spirit and scope of the invention as defined in the appended claim.

We claim:

A rigid one piece translucent nestable plant protector comprising a body member in the form of a conoidal shell, said body member having a closed end portion, an open end and a side wall portion, a plurality of spaced ground penetrating leg members originating as integral thickened portions of said side wall portion and extending downwardly from said side wall portion and from the open end of said body member, each leg member having a length about one-half the height of the dome formed by the body member to enable selective depth penetration, knockout sections provided in said side wall portion and in said closed end portion of said body member, said knockout sections adapted to be completely knocked out as desired to form ventilation openings in said body member, each of said leg members having a flanged pointed portion to enable penetration of the ground and retention of the leg member therein, said knockout sections being of different sizes relative to each other for enabling control of ventilation.

(References on following page)

References Cited by the Examiner

UNITED STATES PATENTS

| | | | |
|---|---|---|---|
| 291,569 | 1/84 | Borner | 47—47 |
| 327,510 | 10/85 | Anderson | 47—26 |
| 1,611,759 | 12/26 | McWhirter | 47—28 |
| 1,848,345 | 3/32 | Gregg | 47—28 |
| 2,260,436 | 10/41 | Chambers | 47—28 |
| 2,626,483 | 1/53 | Service | 47—29 |
| 2,697,535 | 12/54 | Olson | 220—27 XR |
| 2,810,234 | 10/57 | Blackburn et al. | 220—27 |
| 3,088,244 | 5/63 | Commisso | 47—29 |

FOREIGN PATENTS 97,853   7/29   Hungary.

ABRAHAM G. STONE, *Primary Examiner.*